United States Patent [19]

Urushibata

[11] Patent Number: 4,837,844
[45] Date of Patent: Jun. 6, 1989

[54] IMAGE PROCESSING APPARATUS

[75] Inventor: Yukio Urushibata, Tokyo, Japan

[73] Assignee: Kabushiki Kaisha Toshiba, Kawasaki, Japan

[21] Appl. No.: 43,251

[22] Filed: Apr. 27, 1987

[51] Int. Cl.[4] .............................................. G06K 9/36
[52] U.S. Cl. ..................................... 382/44; 364/521; 364/900; 382/41
[58] Field of Search ....................... 382/44, 45, 46, 41, 382/49; 364/521, 200 MS File, 900 MS File; 340/727

[56] References Cited

U.S. PATENT DOCUMENTS

| | | | |
|---|---|---|---|
| 3,976,982 | 8/1976 | Eiselen | 382/44 |
| 4,052,699 | 10/1977 | Micka | 382/46 |
| 4,415,928 | 11/1983 | Strolle | 340/727 |
| 4,437,121 | 3/1984 | Taylor | 382/46 |
| 4,636,783 | 1/1987 | Omachi | 382/46 |
| 4,672,680 | 6/1987 | Middleton | 382/46 |
| 4,680,630 | 7/1987 | Field | 382/46 |

OTHER PUBLICATIONS

"A New Approach to Image Registration on a Minicomputer", Brad Simpson, 1982, pp. 68–70.

Primary Examiner—Leo H. Boudreau
Assistant Examiner—Joseph Mancuso
Attorney, Agent, or Firm—Cushman, Darby & Cushman

[57] ABSTRACT

An affine conversion address generated by an affine conversion address generator and a detection signal from an outside-the-image memory area detector are transferred to a first image memory, together with a read signal, via a control bus. Image data is read out from a pixel position of the first image memory designated by the affine conversion address on the address bus of the control bus. The image data read out from the first image memory is supplied to a gate circuit together with the detection signal on the control bus. The gate circuit outputs the image data read out from the first image memory directly or after converting it to predetermined image data in accordance with the detection signal on the control bus. The image data output from the gate circuit is transferred to a second image memory, together with a busy signal indicating a data transfer, via an image bus provided independently of the control bus. Thus, the second image memory stores the transferred image data in accordance with raster addresses sequentially generated in the second image memory itself.

9 Claims, 7 Drawing Sheets

F I G. 3
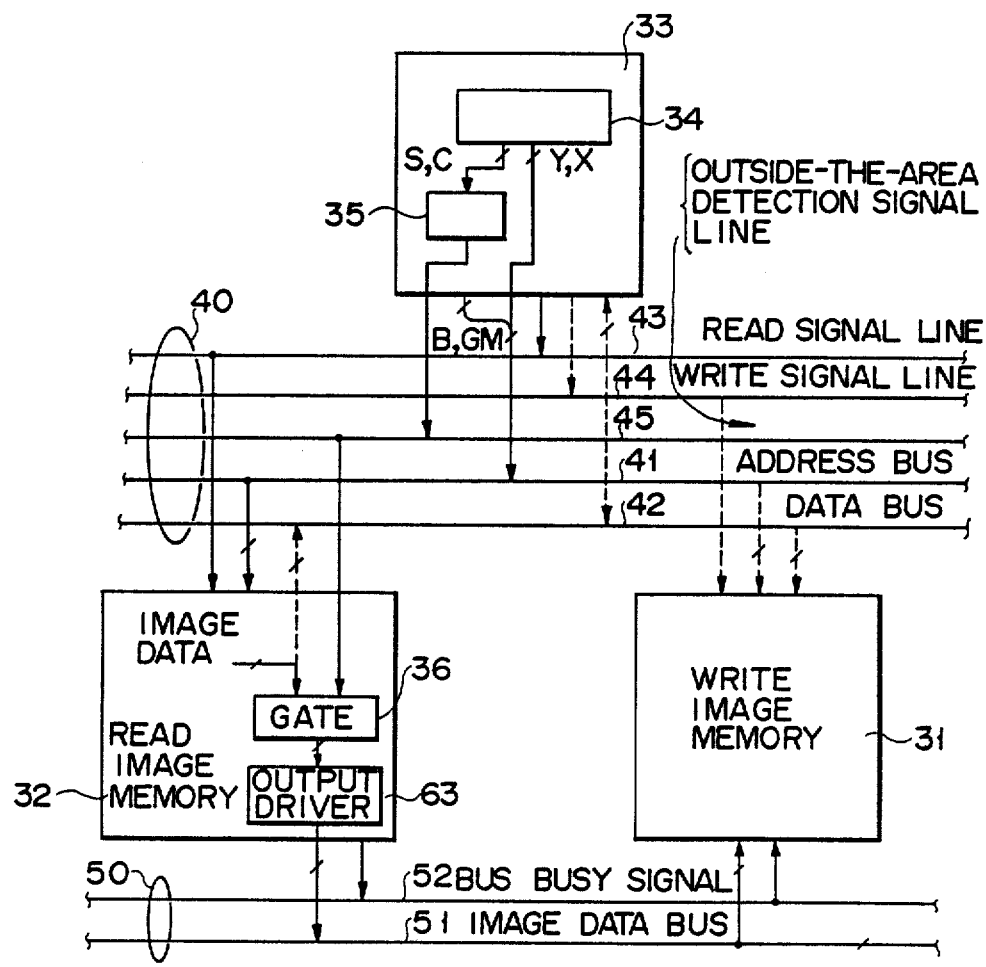
F I G. 4
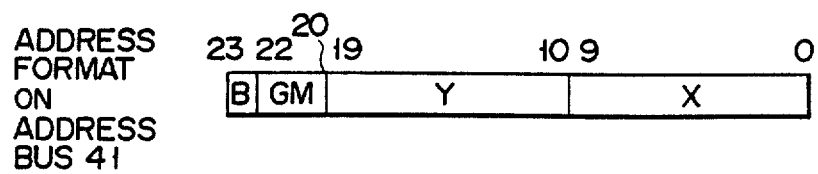

B=1, GM=0
B=1  GM=1
B=1  GM=2

F I G. 7
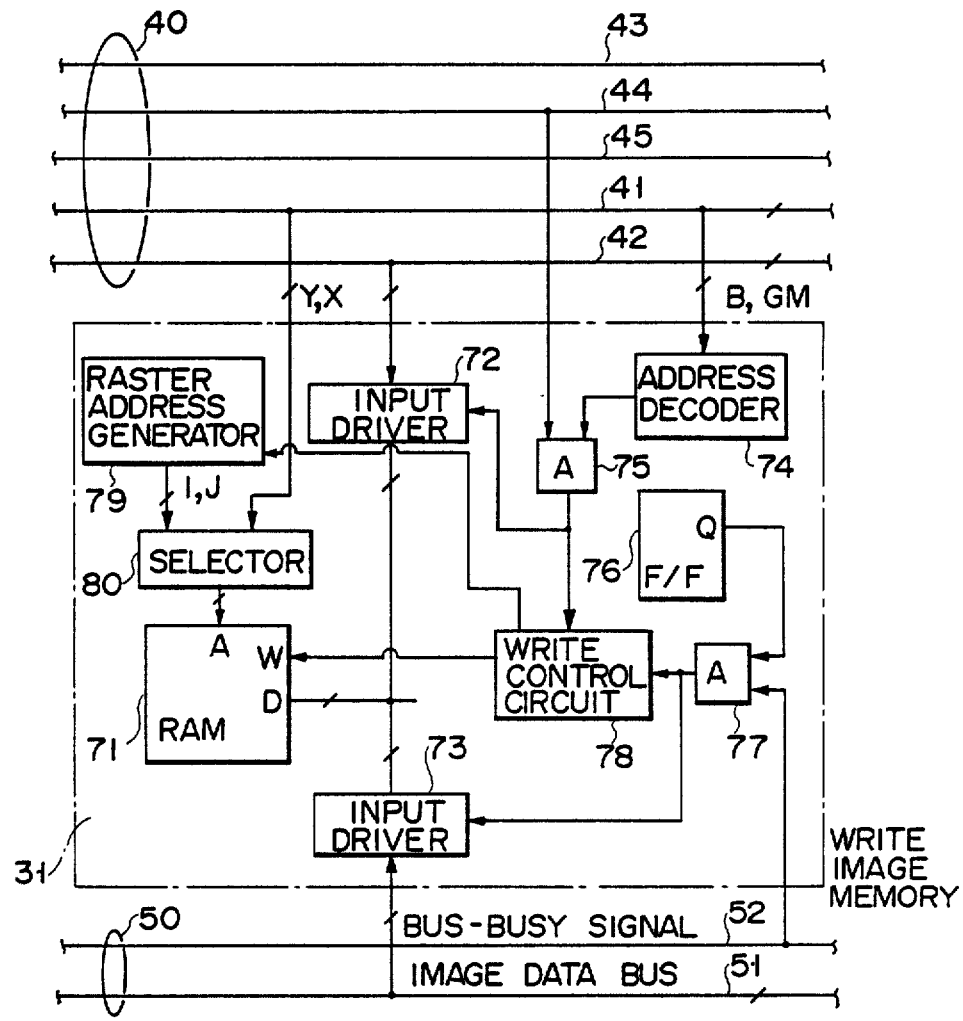

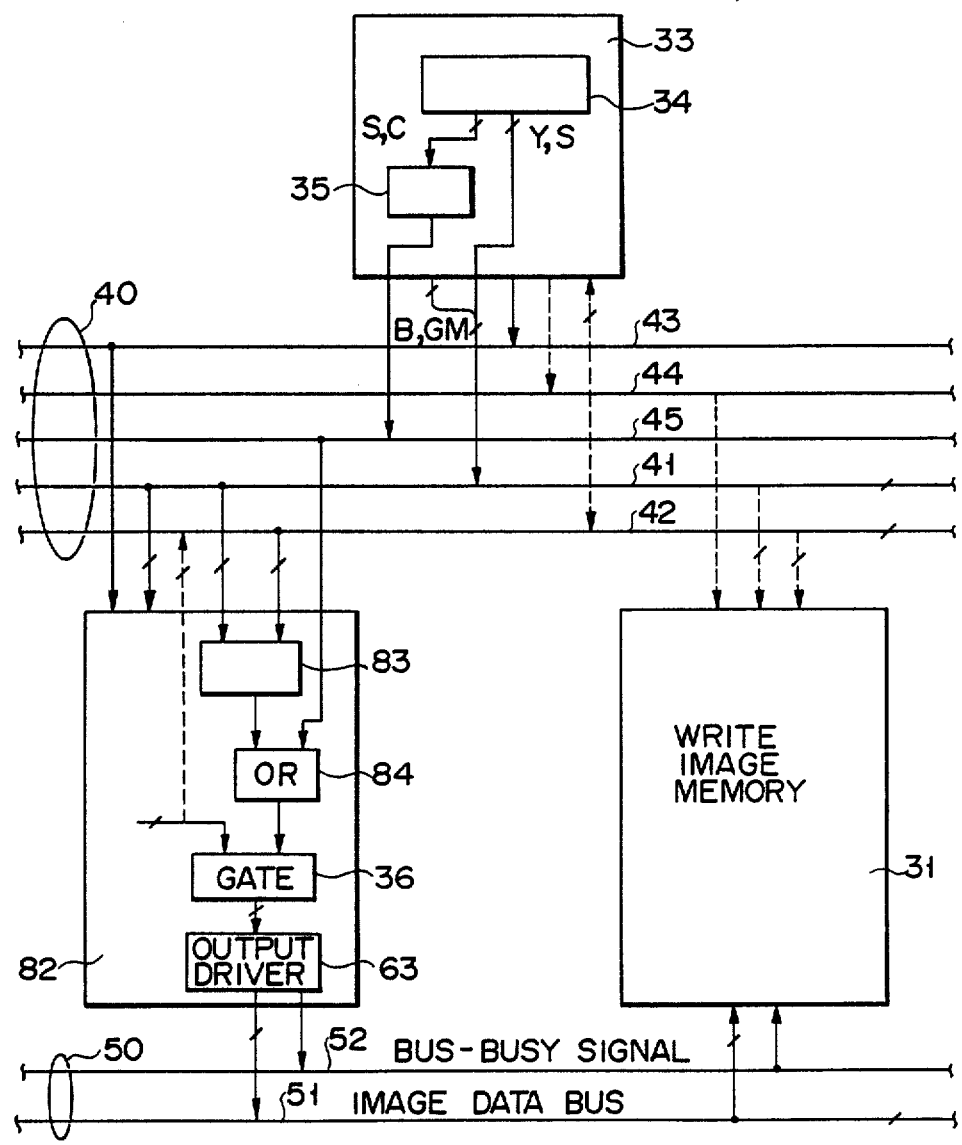
F I G. 10

IMAGE PROCESSING APPARATUS

BACKGROUND OF THE INVENTION

The present invention relates to an image processing apparatus having an affine conversion for performing reduction, enlargement, and rotation of an image.

According to affine conversion as one of the functions of an image processing apparatus, an image stored in a read (input) image memory is reduced, enlarged, or rotated and is output to a write (output) image memory. An image processing apparatus having the affine conversion function conventionally has an arrangement as shown in FIG. 1. By the affine conversion of the image processing apparatus shown in FIG. 1, image data is written in write image memory 11 in accordance with a raster operation. The image data is read out from an address (X, Y) of read image memory 12 that corresponds to the raster address (I, J) of write image memory 11. Address (X, Y) is calculated by affine conversion address generator 13 in accordance with the following equations:

$$X = aI + bJ + c \quad ...(1)$$

$$Y = dI + eJ + f \quad ...(2)$$

where a, b, c, d, e, and f are constants.

Address generator 13 calculates address (X, Y) of memory 12 that corresponds to address (I, J) of memory 11 and outputs it onto address bus 21 of control bus 20 as an image input read address, as shown in FIG. 2A. In this case, address generator 13 supplies a read signal onto read signal line 23 of control bus 20. In response to the read signal received from control bus 20, image data is read out from a pixel position of memory 12 designated by address (X, Y) input through address bus 21.

The image data read out from memory 12, i.e., the image data at the position of address (X, Y) is supplied to data bus 22 of control bus 20, as shown in FIG. 2B. Address generator 13 fetches and latches the image data on data bus 22. In the next cycle, address generator 13 outputs the latched data onto data bus 22 and address (I, J) of memory 11 onto address bus 21 (see FIG. 2A). At the same time, address generator 13 supplies a write signal onto write signal line 24 of control bus 20. In response to the write signal, data input through data bus 22 is written at a pixel position of memory 11 designated by address (I, J) input through address bus 21. The above operation is repeated every 2 bus cycles (2T) of control bus 20 while raster address (I, J) is being updated.

In this manner, affine conversion address generator 13 of the conventional image processing apparatus shown in FIG. 1 requires 2 cycles for one-pixel affine conversion, that is, a read cycle for transferring affine conversion address (X, Y) to read image memory 12 together with a read signal and reading image data from memory 12, and a write cycle for transferring the read image data to write image memory 11 together with raster address (I, J) and a write signal and enabling writing to memory 11. Therefore, the conventional image processing apparatus cannot perform high-speed affine conversion.

SUMMARY OF THE INVENTION

It is an object of the present invention to provide an image processing apparatus which can perform a write cycle for storing image data in a write image memory location designated by a raster address even during a read cycle for reading the image data from a read image memory location designated by an affine conversion address, thereby enabling high-speed affine conversion.

It is another object of the present invention to provide an image processing apparatus which can replace an unnecessary image data read out from a read image memory with predetermined image data when the result of calculation for obtaining an affine conversion address indicates that the address falls outside an image memory area.

It is still another object of the present invention to provide an image processing apparatus which can replace image data read out from a read image memory with predetermined image data when the result of calculation for obtaining an affine conversion address indicates that the address falls outside a predetermined window.

In order to achieve the above objects, the image processing apparatus of the present invention for reading out image data stored in a first image memory, performing affine conversion of the readout image data, and writing the converted image data in a second image memory, comprises: an affine conversion address generator for outputting an affine conversion address, used for reading out the image data, and a read control signal based on a raster address; an outside-the-image memory area detector, connected to the affine conversion address generator, for detecting whether the affine conversion address output from the affine conversion address generator falls outside an image memory area; a control bus, connected to the affine conversion address generator, the outside-the-image memory area detector, and the first and second image memories, for transferring a detection signal from the outside-the-image memory area detector and the affine conversion address and the read signal from the affine conversion address generator; an image bus, connected to the first and second image memories, for operating independently of the control bus in order to transfer the image data and a busy signal; first image memory control means for reading out, in response to the read signal on the control bus, image data from a location of the first image memory defined by the affine conversion address and outputting the busy signal indicating data transfer to the image bus; a gate circuit, connected between the first and second image memories, for outputting, in response to the detection signal from the control bus, the image data read out from the first image memory directly or after converting it to predetermined image data; and second image memory control means for storing, in response to the busy signal on the image bus, the image data on the image bus in the second image memory in accordance with the raster address.

According to the image processing apparatus of the present invention, a write cycle for storing image data in a second image memory (write image memory) location designated by a raster address can be performed even during a read cycle for reading the image data from a first image memory (read image memory) location designated by an affine conversion address. In addition, unnecessary image data read out from the read image memory can be replaced with predetermined image data when the result of calculation for obtaining an affine conversion address indicates that the address falls outside an image memory area. An outside-the-window detector for detecting whether a pixel position designated by an affine conversion address falls outside a predetermined window is provided. A detection signal from the outside-the-window detector is supplied to the gate circuit together with a detection signal from the outside-the-area detector. Therefore, unnecessary image data read out from the read image memory can be replaced with predetermined image data when the result of calculation for obtaining an affine conversion address indicates that the address falls outside a predetermined window.

BRIEF DESCRIPTION OF THE DRAWINGS

FIG. 3 is a block diagram showing an image processing apparatus according to a first embodiment of the present invention;

FIG. 4 shows the format of an address transferred through address bus 41 shown in FIG. 3;

FIG. 7 is a block diagram of write image memory 31 shown in FIG. 3;

FIG. 10 is a block diagram showing an image processing apparatus according to a second embodiment of the present invention;

DETAILED DESCRIPTION OF THE PREFERRED EMBODIMENTS

Figure 1:
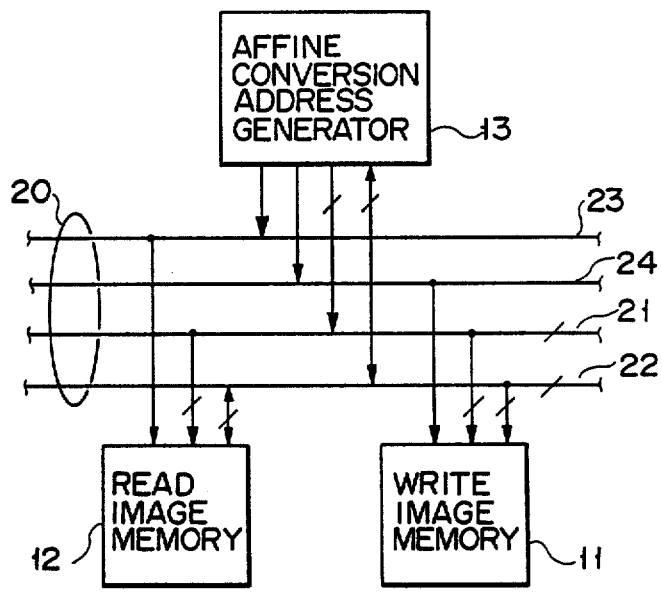
FIG. 1 is a block diagram of a conventional image processing apparatus.
Figure 2A:
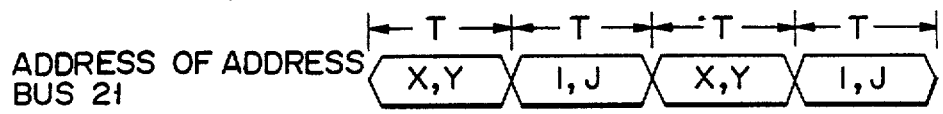
FIGS. 2A and 2B are timing charts for explaining the operation of the image processing apparatus shown in FIG. 1.
Figure 2B:

FIG. 3 is a block diagram of an image processing apparatus according to a first embodiment of the present invention. This image processing apparatus has write image memory 31, read image memory 32, and affine conversion address generator 33. Address generator 33 has affine conversion address calculation circuit 34 and outside-the-image memory area detector 35. Calculation circuit 34 calculates an affine conversion address based on a raster address. Based on sign bit S and carry bit C from calculation circuit 34, detector 35 detects that the result of affine conversion address calculation by calculation circuit 34 indicates that the address falls outside the image memory area, and outputs an outside-the-image memory area detection signal. Detector 35 can be provided outside address generator 33.

Write and read image memories 31 and 32 and affine conversion address generator 33 are connected to control bus 40 together with a CPU (not shown) for controlling the entire apparatus. Memories 31 and 32 are also connected to image bus 50 independent from control bus 40. The arrangement of control bus 40 is similar to that of control bus 20 shown in FIG. 1. Control bus 40 has address bus 41 for transferring, e.g., a 24-bit address, data bus 42 for transferring data of various types, read and write signal lines 43 and 44, and outside-the-area detection signal line 45 used for transferring the outside-the-image memory area detection signal. Image data bus 50 has image data bus 51 for transferring image data, and busy signal line 52 for indicating that bus 51 is busy, in other words, image data is being transferred. Image memory 32 has gate circuit 36 and output driver 63. Gate circuit 36 outputs image data read out from image memory 32 directly, or after setting it to "0" level by an outside-the-image memory area signal on signal line 45 of control bus 40. Output driver 63 supplies image data output from gate circuit 36 onto image data bus 51 of image bus 50. A more detailed arrangement of memory 32 is shown in FIG. 6.

In this embodiment, a type of memory mapped I/O method is employed. Therefore, on control bus 40, the image memory areas of various image memories connected to control bus 40 are linearly assigned to the second 8-megabyte area of the 16-megabyte address space, supported by a 24-bit address, in units of megabytes. The areas (called control address areas) and so on of machine addresses for designating respective devices of the apparatus, such as write and read image memories 31 and 32 and affine conversion address generator 33, which are connected to control bus 40 are assigned to the first 8-megabyte area of the 16-megabyte address space.

Figure 5:
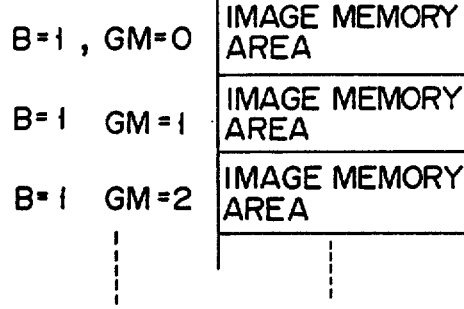
FIG. 5 is a view showing a correspondence between an image memory area allocated in an address space, and base number B and image memory number GM of an address, respectively, in the embodiment shown in FIG. 3.

FIG. 4 shows the format of an address when the address transferred through address bus 41 indicates a pixel position in the image memory area, and FIG. 5 shows image memory areas allocated in the address space supported by this address. The address shown in FIG. 4 consists of base number B (1 bit), image memory number GM (3 bits), and Y and X addresses (both 10 bits) as a two-dimensional address. Base number B designates an address space for either the image memory or control address area. Image memory number GM designates one 1 M-byte image memory area when base number B designates an address space for the image memory area (in this case B=1). The Y and X addresses indicate the pixel position in the image memory area.

Figure 6:
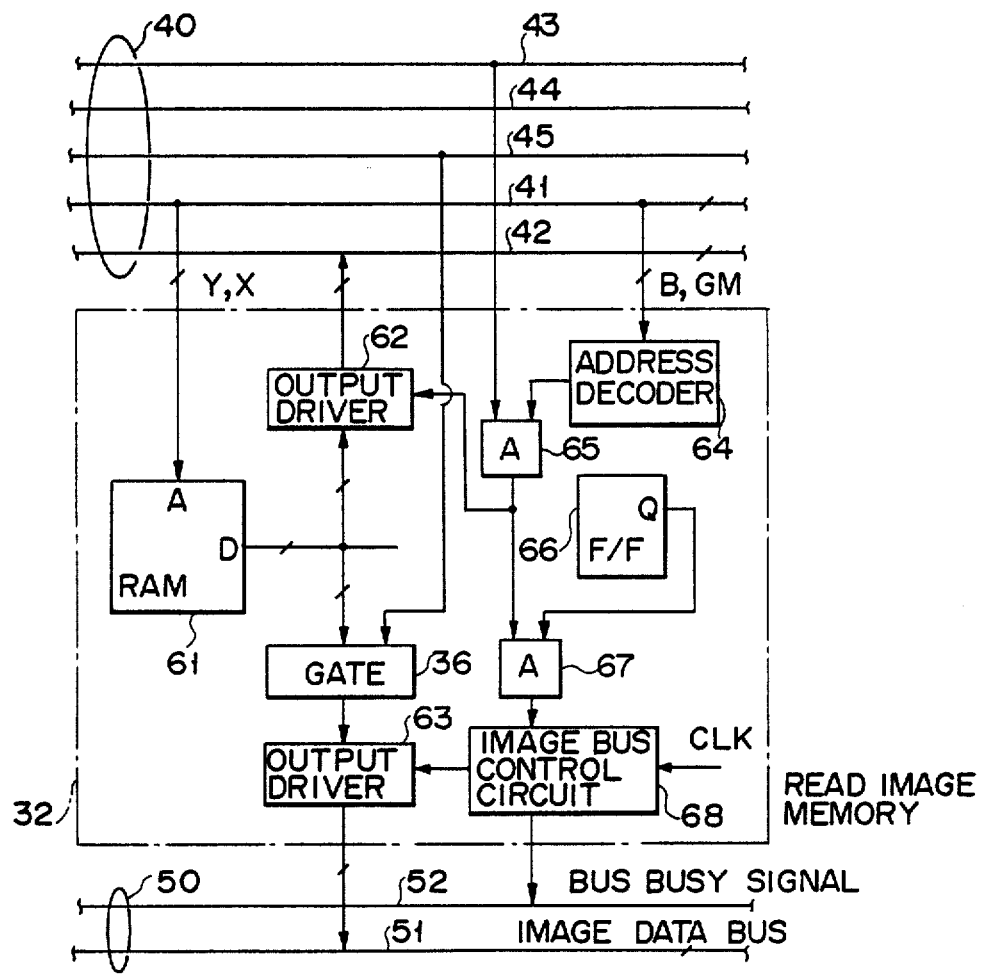
FIG. 6 is a block diagram of read image memory 32 shown in FIG. 3.

FIG. 6 shows the block diagram of read image memory 32. The address area of 1 M-byte RAM 61 is assigned to the image memory area in the address space corresponding to memory 32. Address port A of RAM 61 receives Y and X addresses of the address shown in FIG. 4 input through address bus 41. Output driver 62 supplies image data read out from RAM 61 onto data bus 42 of control bus 40. Output driver 63 supplies image data read out from RAM 61 onto image data bus 51 of image bus 50. Gate circuit 36 comprises, e.g., an AND gate group.

Address decoder 64 decodes base number B and image memory bus GM of the address, shown in FIG. 4, which are supplied through address bus 41, detects whether an image memory area to which an address of image memory 32 is assigned is designated, i.e., whether the memory space of RAM 61 is designated, and outputs an address detection signal to AND gate 65. AND gate 65 also receives a read signal from read signal line 43. An output signal from gate 65 is used to control output from output driver 62. Flip-flop (to be referred to as F/F hereinafter) 66 is set by a CPU (not shown). When F/F 66 is set, it means that read image memory 32 is designated. AND gate 67 ANDs a Q output signal from F/F 66 and an output signal from AND gate 65. Image bus control circuit 68 outputs, in synchronism with clock signal CLK, a busy signal to busy signal line 52 of image bus 50 and an output control signal to output driver 63, based on an output signal from AND gate 67 and clock signal CLK supplied from a clock signal line (not shown) of image bus 50.

FIG. 7 is a block diagram of write image memory 31. The address area of 1 M-byte RAM 71 for storing image data is assigned to the image memory area in the address space corresponding to memory 31. Address port A of RAM 71 receives, through selector 80, Y and X addresses of the address shown in FIG. 4 input through address bus 41. Input driver 72 supplies image data supplied from data bus 42 of control bus 40 to data port D of RAM 71. Input driver 73 supplies image data from image data bus 51 of image bus 50 to data port D of RAM 71.

Address decoder 74 decodes base number B and image memory number GM of the address, shown in FIG. 4, which are supplied through address bus 41, detects whether an image memory area to which an address of image memory 31 is assigned is designated, i.e., whether the memory space of RAM 71 is designated, and outputs an address detection signal to AND gate 75. AND gate 75 also receives a write signal from write signal line 44. An output signal from gate 75 is used to control input to input driver 72. F/F 76 is set by a CPU (not shown). When F/F 76 is set, it means that the read image memory 31 is designated. AND gate 77 ANDs a Q output signal from F/F 76 and a busy signal from busy signal line 52 of image bus 50. An output signal from AND gate 77 is used to control input to input driver 73. Write control circuit 78 controls write operation to RAM 71 in accordance with the output signal from AND gate 75 or 77. Control circuit 78 also instructs raster address generator 79 to generate a raster address in response to the output signal from AND gate 77.

Raster address generator 79 generates raster address (I, J) of image memory area (RAM 71) in response to the instruction from write control circuit 78. Selector 80 selectively outputs either the raster address from address generator 79 or the Y and X addresses from address bus 41 to address port A of RAM 71. The raster operation area of address generator 79 is preset by the CPU.

Figure 8:
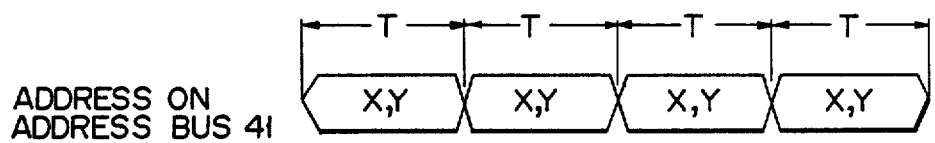
FIG. 8 is a timing chart for explaining the status of address bus 41.
Figures 9A, 9B:
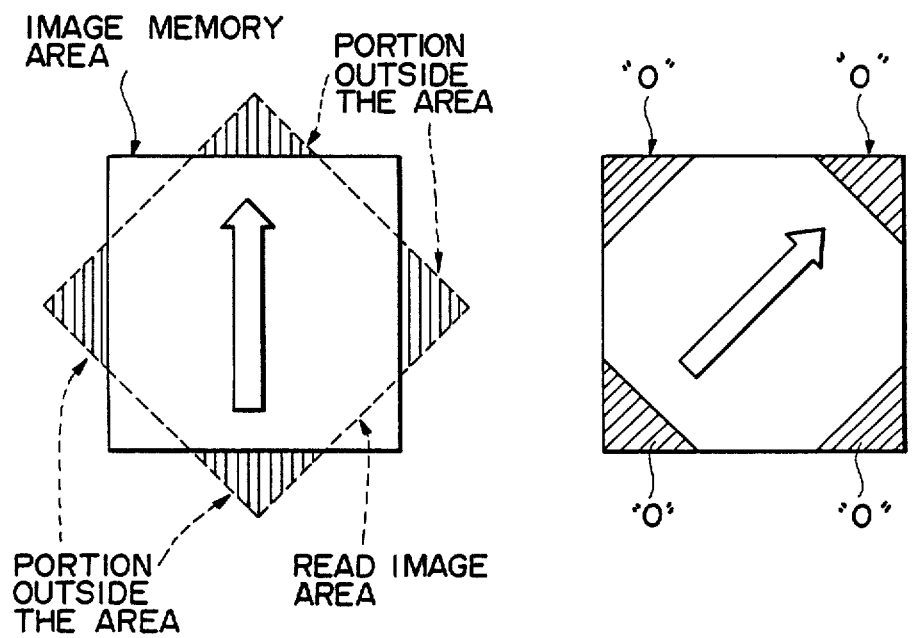
FIGS. 9A and 9B are views showing examples of images before and after affine conversion by the image processing apparatus shown in FIG. 3.

The operation of the image processing apparatus according to the embodiment of the present invention will be described with reference to the timing charts of FIG. 8 and FIGS. 9A and 9B.

When affine conversion is performed, the CPU sets up write and read image memories 31 and 32 and affine conversion address generator 33 in a required manner and initializes them. Then, both F/Fs 76 and 66 of memories 31 and 32, respectively, are set. Data indicating the area as the target of a raster operation is set in raster address generator 79 of memory 31. Address generator 33 calculates affine conversion address (X, Y) based on raster address (I, J), used in writing image data in RAM 71 of memory 31, in accordance with equations (1) and (2). In this case, address calculation circuit 34 generates sign bit S indicating that the calculation result of the affine conversion address underflows (negative) and carry bit C indicating that the calculation result of the affine conversion address overflows. These bits S and C are supplied to outside-the-image memory area detector 35. When bit S indicates an underflow or bit C indicates an overflow, detector 35 detects that the pixel position indicated by the calculation result of the affine conversion address falls outside the image memory area of image memory 32, and outputs an outside-the-image memory area detection signal of logic "1" onto outside-the-area detection signal line 45 of control bus 40.

Affine conversion address generator 33 adds base number B of B=1 and image memory number GM designating read image memory 32 to affine conversion address (X, Y), and supplies the resultant 24-bit address onto address bus 41 of bus 40. In this case, address generator 33 supplies a read signal of logic "1" onto read signal line 43. Address generator 33 repeats the operation in units of cycles (at every 1T) of control bus 40 while updating raster address (I, J) based on the raster operation. Therefore, affine conversion address (X, Y) is output onto address bus 41 at every bus cycle of control bus 4u, as shown in FIG. 8, and affine conversion address (X, Y) and raster address (I, J) are not alternately output at every 1T, unlike in the conventional case.

The Y and X addresses on address bus 41 are guided to address port A of RAM 61 of read image memory 32, and the image data at the address position (pixel position) in RAM 61 designated by the X and Y addresses is read out to output driver 62 and gate circuit 36. Gate circuit 36 also receives an outside-the-image memory area detection signal on outside-the-area detection signal line 45 of control bus 40. When the outside-the-image memory area detection signal is logic "1", i.e., when the pixel position indicated by the calculation result of affine conversion address calculation circuit 34 falls outside the image memory area, gate circuit 36 forcibly sets the image data read out from RAM 61 at "0" and outputs it onto output driver 63. Otherwise, i.e., when the pixel position falls within the image memory area, gate circuit 36 directly outputs the image data read out from RAM 61 onto driver 63.

The base number B and image memory number GM on address bus 41 are guided to address decoder 64 of read image memory 32. When base number B is 1 and memory number GM designates memory 32, as in this case, address decoder 64 outputs an address detection signal of logic "1". This address detection signal is supplied to AND gate 65 together with a read signal on read signal line 43, and AND gate 65 outputs an output signal of logic "1". Output driver 62 is enabled by the output signal of logic "1" from AND gate 65 and supplies the image data read out from RAM 61 onto data bus 42 of control bus 40.

The output signal of logic "1" from AND gate 65 is also supplied to AND gate 67 together with a Q output signal of logic "1" from F/F 66, and AND gate 67 outputs an output signal of logic "1". While the output signal from AND gate 67 is logic "1", image bus control circuit 68 outputs a busy signal of logic "1" synchronized with clock signal CLK onto busy signal line 52 of image bus 50 and enables output driver 63. Output driver 63 then supplies the image data read out from RAM 61 onto image data bus 51 of image bus 50.

The image data on image data bus 51, i.e., the read image data at the pixel position in RAM 61 indicated by affine conversion address (X, Y) is supplied to input driver 73 of write image memory 31 shown in FIG. 7. The busy signal of logic "1" on busy signal line 52 is supplied to AND gate 77 of memory 31. AND gate 77 also receives a Q output signal of logic "1" from F/F 76. As a result, AND gate 77 outputs a signal of logic "1" to input driver 73 and write control circuit 78. Input driver 73 inputs the image data on image data bus 51 to RAM 71 when the output signal from AND gate 77 is logic "1". When the output signal from AND gate 77 is logic "1", write control circuit 78 instructs raster address generator 79 to generate a raster address and supplies a write signal to RAM 71, thereby performing write control of RAM 71. Write control circuit 78 performs write control of RAM 71 when the output signal from gate 75 is at logic "1" as well. Upon reception of an instruction from write control circuit 78 to generate a raster address, address generator 79 starts raster operation in an area designated by the CPU in advance, and updates raster address (I, J). Raster address (I, J) generated by address generator 79 is selected by selector 80 and output to address port A of RAM 71. Thus, the image data on image data bus 51 which is input to RAM 61 through input bus 73 is written at the address position (pixel position) in RAM 61 designated by raster address (I, J), selectively output from selector 80, in response to a write signal from control circuit 78.

As described above, in this embodiment, image data read out from a position of affine conversion address (X, Y) of read image memory 32 is transferred to write image memory 31 via image bus 50, independent from control bus 40, together with a busy signal, and the image data read out from memory 32 can be transferred to memory 31 in accordance with the busy signal on the busy signal line of image bus 50. Furthermore, the image data input to memory 31 is written at its correct pixel position in accordance with raster address (I, J) generated by raster address generator 79 of memory 31. Therefore, affine conversion address generator 33 need only repeat a read cycle (input operation) to generate affine conversion address (X, Y) and a read signal in order to read out image data from memory 32. Unlike in a conventional case, address generator 33 need not repeat read and write cycles, i.e., a cycle to output raster address (I, J) and a write signal onto control bus 40, together with the image data, in order to write the image data, read out from memory 32, in memory 31. As a result, according to this embodiment, affine conversion can be performed at a speed twice that of a conventional case. Note that raster address generator 79 is generally adopted for the purpose of raster operation of RAM 71. In this embodiment, address generator 79 is utilized to generate raster address (I, J) for affine conversion.

In this embodiment, when the pixel position indicated by the calculation result of affine conversion address calculation circuit 34 falls outside the image memory area, the image data read out from RAM 61 is forcibly set to "0" by gate circuit 36 and output to output driver 63. Therefore, in the read target image area shown in FIG. 9A that is calculated by the affine conversion address calculation and that is in accordance with raster address (I, J), a portion falling outside the actual image memory area is replaced by "0" data after affine conversion (e.g., rotation through 45°), as shown in FIG. 9B.

Image data output onto data bus 42 of control bus 40 from output driver 62 of read image memory 32 will now be briefly described. This image data is supplied to input driver 72 of write image memory 31. Input driver 72 is input-enabled only when address decoder 74 detects an address, i.e., when base number B on address bus 41 is 1 and image memory number GM indicates memory 31, and when write signal line 44 supplies a write signal of logic "1". Therefore, when affine conversion address generator 33 repeats a read cycle, as in this embodiment, image data is not input by input driver 72.

FIG. 10 is a block diagram of an image processing apparatus according to a second embodiment of the present invention. The same reference numerals as in FIG. 3 denote the same portions. The image processing apparatus of FIG. 10 is suitable for affine conversion when a window is set, and is different from the apparatus of FIG. 3 in that it uses read image memory 82 in place of read image memory 32. Read image memory 82 is obtained when read image memory 32, shown in FIG. 3, further has outside-the window detector 83 and OR gate (OR) 84 and an output signal from gate 84 is supplied to gate circuit 36 in place of the outside-the-image memory area detection signal on outside-the-area detection signal line 45 of control bus 40. Outside-the-window detector 83 detects that the pixel position indicated by X and Y addresses on data bus 42 falls outside the window and outputs an outside-the-window detection signal. OR gate 84 receives the outside-the-window detection signal supplied from detector 83 and an outside-the-image memory area detection signal from outside-the-area detection signal line 45.

Figure 11:
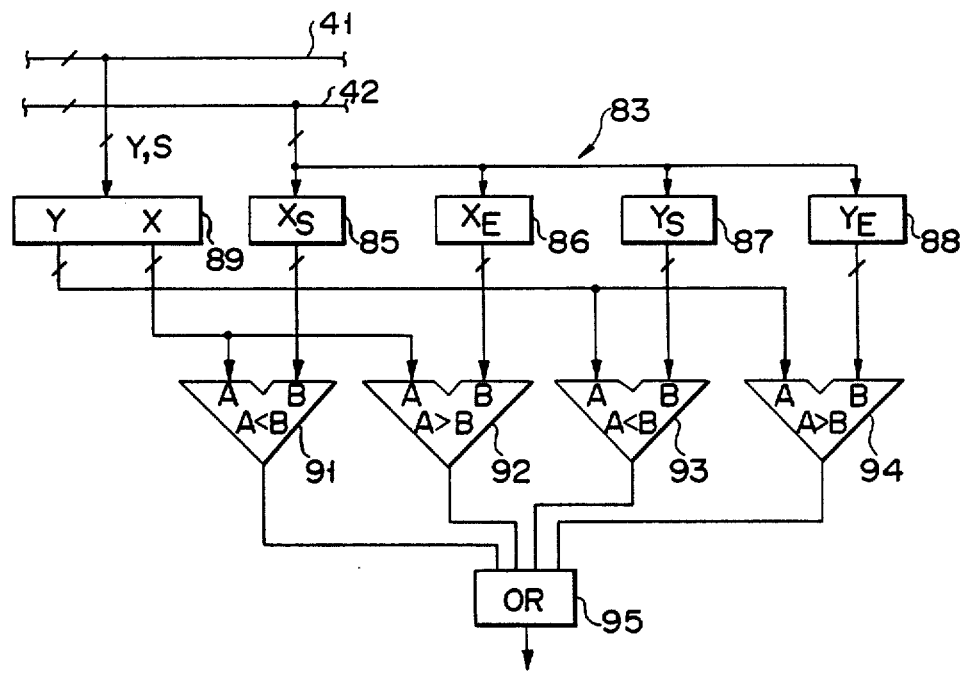
FIG. 11 is a block diagram showing in detail the outside-the-window detector shown in FIG. 3.

FIG. 11 is a block diagram of outside-the-window detector 83. Referring to FIG. 11, X-direction start position XS of the window is set in XS register 85. X-direction end position XE of the window is set in XE register 86. Y-direction start position YS of the window is set in YS register 87. Y-direction end position YE of the window is set in YE register 88. The inputs of registers 85 through 88 are connected to data bus 42. YX register 89 holds Y and X addresses in the address on address bus 41. Comparator 91 detects that the X address in YX register 89 is smaller than X-direction start position XS in XS register 85. Comparator 92 detects that the X address in YX register is larger than X-direction end position XE in XE register 86. Comparator 93 detects that the Y address in YX register 89 is smaller than Y-direction start position YS in YS register 87. Comparator 94 detects that the Y address in YX register 89 is larger than Y-direction end position YE in YE register 88. OR gate 95 ORs output signals from comparators 91 through 94 and outputs the ORed result as an outside-the-window detection signal.

Figures 12A, 12B:
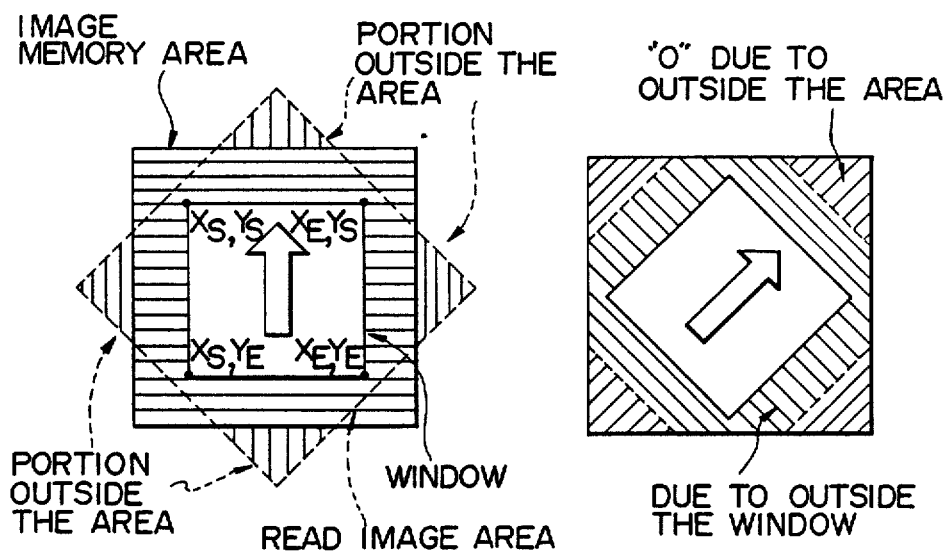
FIGS. 12A and 12B are views showing examples of images before and after affine conversion by the image processing apparatus shown in FIG. 10.

The operation of the second embodiment before and after affine conversion will be described by way of examples of images shown in FIGS. 12A and 12B.

Assume that X-direction start position XS, X-direction end position XE, Y-direction start position YS, and Y-direction end position YE are set in XS, XE, YS, and YE registers 85 through 88, respectively, by an instruction from the CPU and affine conversion operation is performed in this state. In this case, the Y and X addresses of the address on address bus 41 are supplied to address port A of a RAM (not shown) corresponding to RAM 61 shown in FIG. 4 and at the same time to outside-the-window detector 83.

The Y and X addresses supplied to outside-the-window detector 83 are held by YX register 89 in detector 83. The X address is supplied to one input (A input) of each of comparators 91 and 92. The Y address is supplied to one input (A input) of each of comparators 93 and 94. The other inputs (B inputs) of comparators 91 and 92 receive X-direction start and end positions XS and XE set in registers 85 and 86, respectively, and the other inputs (B inputs) of comparators 93 and 94 receive Y-direction start and end positions YS and YE set in registers 87 and 88, respectively. Comparators 91, 92, 93, and 94 set their output signals to logic "1" when X<XS, X>XE, Y<YS, and Y>YE, respectively. OR gate 95 outputs an outside-the-window detection signal of logic "1" indicating that the pixel position indicated by Y and X addresses supplied from address bus 41 falls outside the window when one of the output signals from comparators 91 through 94 is at logic "1".

The outside-the-window detection signal from OR gate 95 is supplied to OR gate 84 as a detection result of outside-the-window detector 83. OR gate 84 also receives an outside-the-image memory area detection signal on outside-the-area detection signal line 45. Gate 84 ORs the outside-the-window detection signal and the outside-the-image memory area detection signal. Therefore, the output signal from gate 84 is set at logic "1" when either one of the outside-the-window or outside-the-image memory area detection signals is at logic "1". The output signal from gate 84 is supplied to gate circuit 36. Gate circuit 36 also receives image data read out from a pixel position indicated by the Y and X addresses supplied from address bus 41. When an OR gate which ORs the respective output signals from comparators 91 through 94 and an outside-the-image memory area detection signal on signal line 45 and supplies the resultant OR output to gate circuit 36 is used in place of OR gate 95, OR gate 84 can be omitted.

Gate circuit 36 directly outputs the image data to output driver 63 when the output signal from OR gate 84 is at logic "0", and changes the image data to logic "0" and outputs it to output driver 63 when the output signal from OR gate 84 is at logic "1". Therefore, of the read out target image area shown in FIG. 12A which is designated by the affine conversion address calculation based on raster address (I, J), a portion falling outside an actual image memory area and window is converted to "0" data after affine conversion, e.g., rotation through 45°, as shown in FIG. 12B.

In the above embodiments, a description is made based on an assumption that two types of image memories are provided, i.e., one for writing (write image memory 31) and one for reading (read image memories 32 and 82 in the first and second embodiments, respectively) for the sake of simplicity. However, it is more preferable that an image memory has both writing/reading functions and can be switched as a write image memory/read image memory by the CPU.

What is claimed is:

1. An image processing apparatus for reading out image data stored in a first image memory, performing affine conversion of the readout image data, and writing the converted image data in a second image memory, comprising:

an affine conversion address generator for outputting an affine conversion address, used for reading out the image data, and a read control signal based on a raster address;

an outside-the-image memory area detector, connected to the affine conversion address generator, for detecting whether the outputted affine conversion address from the affine conversion address generator falls outside an image memory area;

a control bus, connected to the affine conversion address generator, the outside-the-image memory area detector, and the first and second image memories, having a read signal line for transferring a read signal, an outside-the-area detection signal line for transferring a detection signal from the outside-the-image memory area detector, an address bus for transferring the affine conversion address, and a data bus for transferring data of various types;

an image bus, connected to the first and second image memories, having an image data bus for transferring the image data read from the first image memory and a bus busy signal line for transferring a busy signal indicative of the image data transfer to the image bus for operating independently of said control bus in order to transfer the image data and the busy signal;

first image memory control means for reading out, in response to the read signal on the control bus, image data from a location of the first image memory defined by the affine conversion address and outputting the busy signal to the bus busy signal line;

a gate circuit, connected between the first and second image memories, for outputting, in response to the detection signal on the outside-the-area detection signal line, the image data read out from said first image memory directly or after converting it to predetermined image data; and second image memory control means for storing, in response to the busy signal on the bus busy signal line, the image data on the image data bus in the second image memory in accordance with the raster address.

2. An apparatus according to claim 1, further comprising an outside-the-window detector, connected to the affine conversion address generator through the control bus, for detecting whether the affine conversion address supplied from the affine conversion address generator falls outside a predetermined window.

3. An apparatus according to claim 1, wherein the outside-the-image memory area detector calculates $X=aI+bJ+c$ and $Y=dI+eJ+f$ (where X and Y are affine conversion addresses and a, b, c, d, e, and f are constants) based on the raster address used when image data is written in the second image memory, detects whether an obtained address falls outside the image memory area from sign and carry bits generated by this calculation, and outputs an outside-the-image memory area detection signal if the address falls outside the image memory area.

4. An apparatus according to claim 1, wherein the gate circuit converts readout image data to all-"0" data and outputs the all-"0" data when the detection signal on the outside-the-area detection signal line indicates that the address falls outside the image memory area.

5. An apparatus according to claim 1, wherein address spaces of the first and second image memories connected to said control bus have a plurality of image memory area address spaces linearly assigned in units of predetermined memory capacities and control address spaces assigned to the affine conversion address generator and input/output units of the first and second image memories, which are connected to said control bus.

6. An apparatus according to claim 5, wherein a format of an affine conversion address comprises:

a first field for designating either the image memory area address spaces or the control address area address space;

a second field for designating one of the plurality of image memory area address spaces when the first field designates the image memory area address spaces; and a third field for designating a two-dimensional address indicating a pixel position in the image memory area selected by the second field.

7. An apparatus according to claim 1, wherein the affine conversion address generator outputs the affine conversion address and the read control signal to the control bus at every bus cycle of the control bus.

8. An apparatus according to claim 1, wherein the second image memory has a raster address generator.

9. An apparatus according to claim 1, wherein the outside-the-window detector comprises:

a register group for holding X-direction start and end positions of the window, Y-direction start and end positions of the window, and X and Y addresses of the affine conversion address, and a comparator group for detecting if the X address of the affine conversion address is smaller than the X-direction start position, if the X address of the affine conversion address is larger than the X-direction end position, if the Y address of the affine conversion address is smaller than the Y-direction start position, and if the Y address of the affine conversion is larger than the Y-direction end position; and an OR gate for ORing output signals from the comparator group.

* * * * *

UNITED STATES PATENT AND TRADEMARK OFFICE
CERTIFICATE OF CORRECTION

PATENT NO. : 4,837,844

DATED : June 6, 1989

INVENTOR(S) : URUSHIBATA

It is certified that error appears in the above-identified patent and that said Letters Patent is hereby corrected as shown below:

On the cover sheet, insert --[30] Foreign Application Priority Data

Apr. 30, 1986 [JP] Japan................61-98221--.

Signed and Sealed this

Nineteenth Day of June, 1990

Attest:

HARRY F. MANBECK, JR.

*Attesting Officer*    *Commissioner of Patents and Trademarks*